Figure 1:
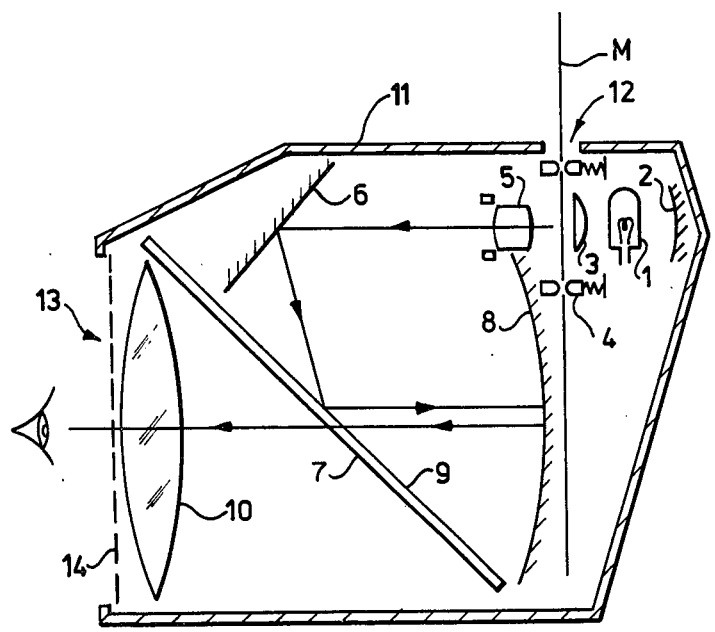

United States Patent [19]

Freeman

[11] 4,200,366
[45] Apr. 29, 1980

[54] MICROFORM READERS

[75] Inventor: Michael H. Freeman, Denbigh, Wales

[73] Assignee: Pilkington P. E. Limited, St. Helens, England

[21] Appl. No.: 846,314

[22] Filed: Oct. 28, 1977

[30] Foreign Application Priority Data

Nov. 5, 1976 [GB] United Kingdom ............... 46060/76

[51] Int. Cl.² ............................................. G03B 21/28
[52] U.S. Cl. ........................................ 353/78; 353/99
[58] Field of Search ..................... 353/74, 98, 99, 77, 353/78

[56] References Cited

U.S. PATENT DOCUMENTS

| | | | |
|---|---|---|---|
| 3,561,860 | 2/1971 | Rudolph | 353/98 |
| 3,567,319 | 3/1971 | Gaston | 353/99 |
| 3,620,592 | 11/1971 | Freeman | 353/99 |
| 3,692,399 | 9/1972 | Stewart | 353/99 |
| 3,796,484 | 3/1974 | Forster | 353/25 |

OTHER PUBLICATIONS

Advertisement from "Melles" Griot Catalogue, pp. 82–83.
Advertisement from Optical Spectra Magazine, Dec. 1974, p. 48.

*Primary Examiner*—Steven L. Stephan
*Attorney, Agent, or Firm*—Mattern, Ware, Davis & Stoltz

[57] ABSTRACT

The invention provides a portable reader for reading, by way of a magnified image, microform material such as microfiche or microfilm. The reader has a support for the microform material and a light source to pass light through the material. A projection lens is provided to project an image of the material on to a screen and there is also a biocular magnifier lens through which an observer can view a magnified version of the image. A partial reflector is disposed in the light paths between the projection lens and the screen and between the screen and the biocular magnifier lens so that light travels from the projection lens to the screen via the partial reflector and from the screen to the biocular magnifier lens via the partial reflector. In a convenient arrangement light travelling from the projection lens is reflected by the partial reflector towards the screen, and light travelling from the screen is transmitted through the partial reflector to the biocular magnifier lens. On the other hand the arrangement may be reversed so that light from the projection lens is transmitted through the partial reflector to the screen while light from the screen is reflected by the partial reflector towards the biocular magnifier lens.

18 Claims, 2 Drawing Figures

MICROFORM READERS

This invention concerns improvements in or relating to microform readers, i.e. devices which enable an observer to view a magnified image of microform material such as microfiche or microfilm.

There have been various prior proposals for microform readers which are intended to be portable but in practice their portability has generally tended to be somewhat limited because of their size.

According to the present invention there is provided a portable microform reader, comprising means for supporting microform material, such as microfiche or microfilm, a light source positioned to pass light through microform material so supported, a projection lens to project an image of the microform material on to a screen, a magnifier lens through which an observer can view a magnified version of said image, and a partial reflector located in the light paths between the projection lens and the screen and between the screen and the magnifier lens so that light travels from the projection lens to the screen via said partial reflector, and from the screen to the magnifier lens via said partial reflector.

Conveniently light travelling from the projection lens is reflected by the partial reflector towards the screen, and light travelling from the screen is transmitted through the partial reflector to the magnifier lens. Alternatively, however, light travelling from the projection lens may be transmitted through the partial reflector to the screen, and light travelling from the screen may be reflected by the partial reflector towards the magnifier lens.

There may be provided light directing means in the light path between the projection lens and the partial reflector. For example, there may be a plane mirror disposed in this light path to reflect light from the projection lens towards the partial reflector. Alternatively, the light directing means may be of a form which effects lateral inversion of the light, for example a prism or roof-edge mirrors.

The screen, which may be diffusely reflecting or retro-reflective, may be of a curved form adapted to suit the characteristics of the magnifier lens. The magnifier lens may consist of a single lens element or a plurality of lens elements, and may be of a plastics material, and if desired a light absorbing plastics material.

The partial reflector may comprise a plate having a partially reflecting (e.g. nominally semi-reflecting) surface, for example provided by a suitable film or coating preferably on a light absorbing substrate (e.g. having an absorption of about 50%). Alternatively, the partial reflector may comprise a pellicle, and in that case the reader may include two screens disposed at equal optical distances from the projection lens so that an image of the microform material can be formed on each screen, one screen being located to receive light from the projection lens reflected by the pellicle and the other screen being located to receive light from the projection lens transmitted through the pellicle, and the magnifier lens then receiving light from said one screen transmitted through the pellicle and light from said other screen reflected by the pellicle.

Preferably the reader comprises a housing having an inner surface of light absorbing material, the housing having an opening or window through which an observer can view. There may be provided a filter or circular polariser located at or near said opening or window and between the observer and the magnifier lens. If desired a sheet or plate of light absorbing plastics material may be provided at or near said opening or window.

Figure 2:
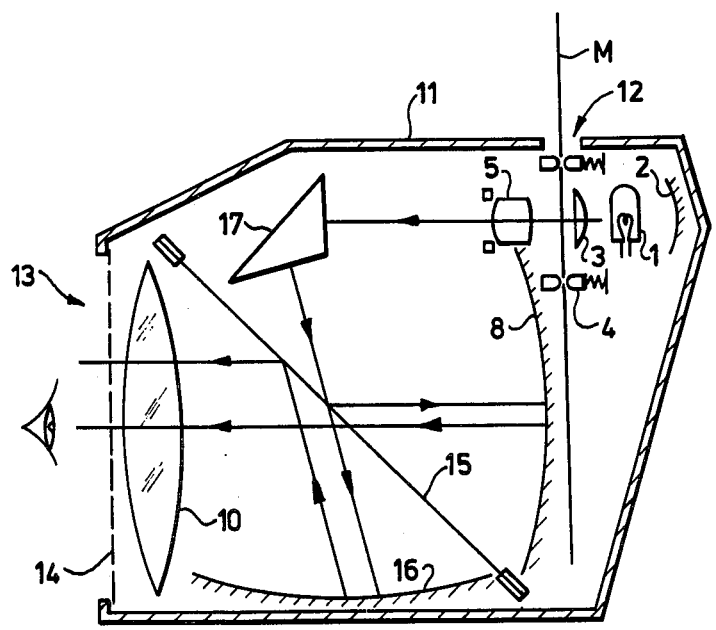

Embodiments of a microform reader in accordance with the invention will now be described, by way of example, with reference to the accompanying drawings in which:

FIG. 1 is a schematic sectional view of a first embodiment of microfiche reader, and FIG. 2 is a schematic sectional view of a second embodiment of microfiche reader.

FIG. 1 shows a light source in the form of a lamp 1 backed by a concave mirror 2 and having an associated condenser lens 3. Suitable means 4 are provided to support a microfiche M between the lamp and condenser system and a projection lens 5. Light passing through the microfiche is projected by the lens 5 via an inclined plane mirror 6 and a partial reflector plate 7 to produce an image of the microfiche on a reflective screen 8.

The partial reflector plate 7 comprises a substrate having a film or coating providing a partially reflecting surface 9 which is nominally semi-reflecting (although fairly wide variations from an exact 50/50 reflection/-transmission ratio are generally tolerable). The plate 7 is disposed at an angle such that light from the projection lens 5 which is directed by reflection from the mirror 6 onto the surface 9 is partially reflected from the surface 9 towards the screen 8 on which an image of the microfiche is formed. The substrate of the plate 7 is light absorbing, e.g. has a 50% absorption, in order to suppress possible ghost images.

The partial reflector plate 7 is located between the screen 8 and a biocular magnifier lens 10 through which an observer can view the screen 8. Due to the action of the lens 10 the observer sees a magnified version (in the form of a virtual image) of the microfiche image formed on the screen 8. The screen 8 may, as shown, be curved to suit the characteristics of the lens 10.

It will be seen that the partial reflector plate 7 is located in both the light path between the projection lens 5 and the screen 8 and the light path between the screen 8 and the magnifier lens 10. Thus light from the projection lens 5 travels via the plate 7 to the screen 8, such light being reflected by the partially reflecting surface 9, and light from the screen 8 travels via the plate 7 to the magnifier lens 10, such light being transmitted through the partially reflecting surface 9.

The above described parts are contained in a housing 11 whose inner surfaces are formed of light absorbing material in order to reduce adverse effects of stray or unused light. The housing has a slot 12, through which a microfiche M can be inserted to be supported by the means 4, and an opening or window 13 through which an observer views. A circular polariser or filter 14 is provided at or near the window or opening 13 between the observer and the magnifier lens 10 in order to reduce surface reflections. If desired, such filter may be angled, conveniently downwards, relatively to the normal line of sight of the observer.

The embodiment of FIG. 2 is generally similar to that of FIG. 1 and the same reference numerals are used to indicate the same parts. However, in the FIG. 2 embodiment the partial reflector is provided by a pellicle 15 (in place of the plate 7 of FIG. 1) and a further reflective screen 16 is provided beneath the pellicle. Also in FIG. 2 that light directing means between the projection lens 5 and the partial reflector 15 is in the form of a prism 17 (in place of the plane mirror 6) for a purpose explained later.

The screens 8 and 16 are disposed at equal optical distances from the projection lens 5 so that an image of the microfiche M is formed on each screen as follows. Light from the lens 5 is directed by the prism 17 on to the pellicle 15. The light reflected by the pellicle travels towards the screen 8 to form an image thereon while the light transmitted through the pellicle travels towards the screen 16 to form an image thereon. Light from the screen 8 transmitted through the pellicle 15 travels to the magnifier lens 10, and light from the screen 16 reflected by the pellicle 15 also travels to the magnifier lens 10. An observer viewing through the magnifier lens 10 can thus see a magnified virtual image of the microfiche by viewing the corresponding images on both screens 8 and 16 simultaneously. It will be appreciated that by this arrangement a high light utilisation, and hence image brightness, can be achieved. It will further be appreciated that the brightness is also improved by the use of a pellicle partial reflector as in the FIG. 2 embodiment in that this removes the requirement which occurs with a plate 7 as in the FIG. 1 embodiment for light absorption by the partial reflector to suppress ghost images.

It will further be appreciated that, if desired, the light utilisation could be further improved by use of a polarisation-selective partial reflector adapted to reflect light of one polarisation, e.g. polarised in one plane, and to transmit light of a different polarisation, e.g. polarised in the orthogonal plane, and the provision of polarisation elements, such as quarter-wave plate, in association with the screens 8 and 16. With such an arrangement substantially all the light reflected by the partial reflector 15 towards the screen 8 can be returned to the partial reflector in a state of polarisation such that it is transmitted therethrough to the lens 10, and substantially all the light transmitted through the partial reflector 15 to the screen 16 can be returned to the partial reflector in a state of polarisation such that it is reflected thereby to the lens 10. However, such polarisation arrangements may increase the cost of the equipment to a commerically unacceptable level.

The prism 17 in the FIG. 2 embodiment is of a form which, by a double reflection, effects a lateral inversion of the light from the projection lens 5 so that the image of the microfiche viewed by the observer is the same way round (as distinct from a mirror image) as the microfiche itself. Thus, the microfiche M can be inserted with its content as viewed by the observer the "right" way round (which may assist e.g. in reading a title on the microfiche as it is being inserted into the reader). A further alternative possible form of light directing means in place of the prism 17 is an arrangement of roof edge mirrors which also effect such lateral inversion. These laterally inverting arrangements have the advantage of permitting insertion of the microfiche the "right" way round but are more costly than the simple plane mirror 6 of the FIG. 1 embodiment (which requires insertion of the microfiche the "wrong" way round due to the single reflection from the mirror 6).

The magnifier lens 10 is preferably of plastics material, and may consist of a single lens element, as shown, or a plurality of lens elements particularly if higher magnifications are required. In order to improve the contrast in the microfiche image viewed by the observer a light absorbing material may be used for the lens 10 so that it tends to absorb stray background light. Although this will obviously reduce the image brightness, the improved contrast may in some circumstances be desirable at the expense of brightness. For the same purpose a sheet or plate (not shown) of light absorbing plastics material may be provided at or near the window or opening 13.

The screens 8 and 16 are conveniently diffusely reflecting but, if desired, retro-reflective screens may be employed.

It will be appreciated that the means 4 for supporting the microfiche M, which may for example take the form of simple spring-urged clamps, are such as to permit ready positional adjustment of the microfiche in order correctly to locate a desired part to be viewed in the light beam between the lamp 1 and the projection lens 5. It will further be appreciated that, although the above described specific embodiments take the form of microfiche readers, essentially similar embodiments can be used for viewing other forms of microform material, such as microfilm, the supporting means 4 being adapted to support the particular form of microform material for which the reader is to be used.

It will be seen that a microform reader as described above can be relatively small in size and weight, thus permitting ready portability, whilst presenting to an observer a sufficiently bright image of satisfactory size. By way of example, such a microfiche reader occupying a volume within a cube of about 4 to 5 inches side can provide a virtual image of about 12 inches side. This compares favourably with previously proposed readers of, for example, a size which is not less than a cube of 12 inches side.

What is claimed is:

1. A portable microform reader, comprising means for supporting microform material, a light source positioned to pass light through microform material so supported, a projection lens to project an image of the microform material on to a screen, a biocular magnifier lens through which an observer can view a magnified version of said image, and a partial reflector located in the light paths between the projection lens and the screen and between the screen and the biocular magnifier lens so that light travels from the projection lens to the screen via said partial reflector, and from the screen to the biocular magnifier lens via said partial reflector.

2. A reader according to claim 1 comprising light directing means in the light path between the projection lens and the partial reflector.

3. A reader according to claim 2 wherein said light directing means comprises a plane mirror disposed to reflect light from the projection lens towards the partial reflector.

4. A reader according to claim 2 wherein said light directing means is arranged to effect lateral inversion of the light.

5. A reader according to claim 1 wherein said screen is of a curved form adapted to suit the characteristics of the biocular magnifier lens.

6. A reader according to claim 1 comprising a light directing means in the ligh path between the projection lens and the partial reflector and wherein the screen is of a curved form adapted to suit the characteristics of the biocular magnifier lens.

7. A reader according to claim 1 comprising a light directing means in the form of a plane mirror in the light path between the projection lens and the partial reflector to reflect light from the projection lens towards the partial reflector and wherein the screen is of a curved form adapted to suit the characteristics of the biocular magnifier lens.

8. A reader according to claim 1 wherein said biocular magnifier lens is made of a light absorbing plastics material.

9. A reader according to claim 1 wherein said partial reflector comprises a plate having a partially reflecting surface.

10. A reader according to claim 9 wherein said partially reflecting surface is provided by a film or coating on a light absorbing substrate providing said plate and having a light absorption of about 50%.

11. A reader according to claim 1 wherein said partial reflector comprises a pellicle.

12. A reader according to claim 1 comprising a light directing means in the light path between the projection lens and the partial reflector and a biocular magnifier lens made of a light absorbing plastics material.

13. A reader according to claim 1 comprising a light directing means in the light path between the projection lens and the partial reflector, a biocular magnifier lens made of a light absorbing plastics material, and a screen of a curved form adapted to suit the characteristics of the magnifier lens.

14. A reader according to claim 1 comprising a light directing means in the form of a plane mirror in the light path between the projection lens and the partial reflector to reflect light from the projection lens towards the partial reflector and wherein the screen is of a curved form adapted to suit the characteristics of the biocular magnifier lens and wherein the biocular magnifier lens is made of a light absorbing plastics material.

15. A reader according to claim 1 comprising a light directing means in the form of a plane mirror in the light path between the projection lens and the partial reflector to reflect light from the projection lens towards the partial reflector and wherein the screen is of a curved form adapted to suit the characteristics of the biocular magnifier lens and wherein the partial reflector comprises a plate having a partially reflective surface.

16. A reader according to claim 11 including two screens disposed at equal optical distances from the projection lens with one screen located to receive light from the projection lens reflected by the pellicle and the other screen located to receive light from the projection lens transmitted through the pellicle so that an image of the microform material can be formed on each screen, the biocular magnifier lens receiving light from said one screen transmitted through the pellicle and light from said other screen reflected by the pellicle.

17. A reader according to claim 1 comprising a housing having an inner surface of light absorbing material and an opening or window through which an observer can view.

18. A reader according to claim 17 comprising a filter or circular polariser located at or near said opening or window so as to be between the observer and the biocular magnifier lens.

* * * * *